Dec. 14, 1937.  G. H. FRASER  2,102,314
DRIVE AND DIFFERENTIAL
Original Filed Nov. 21, 1932
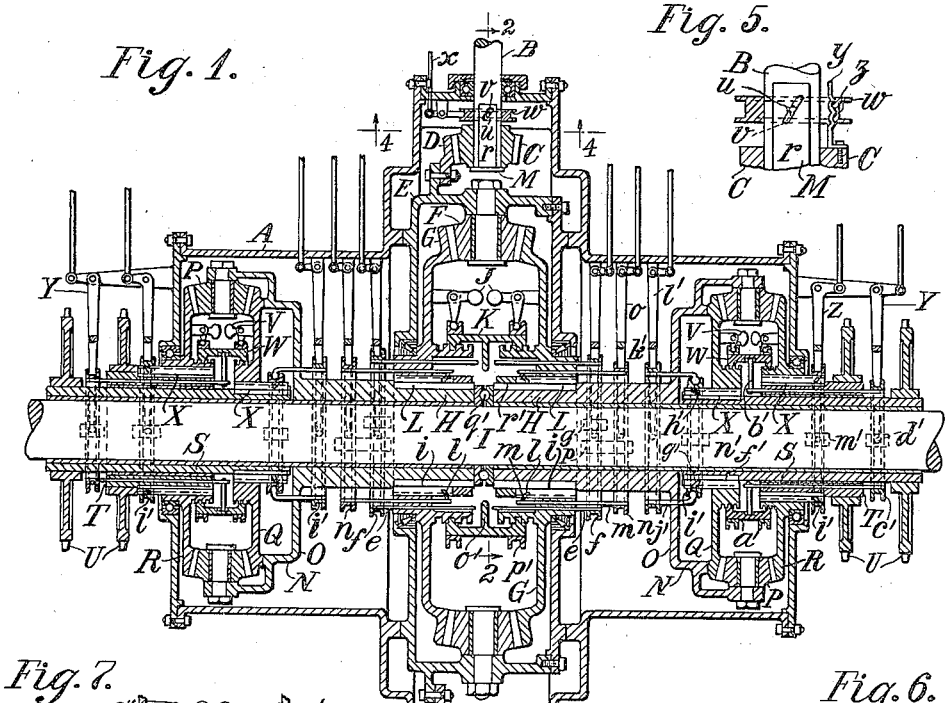
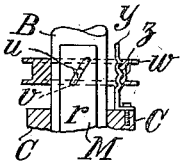
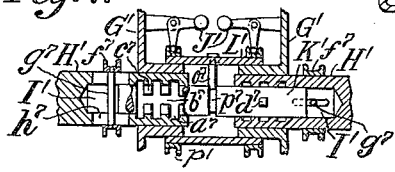
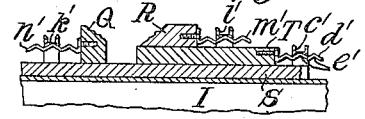
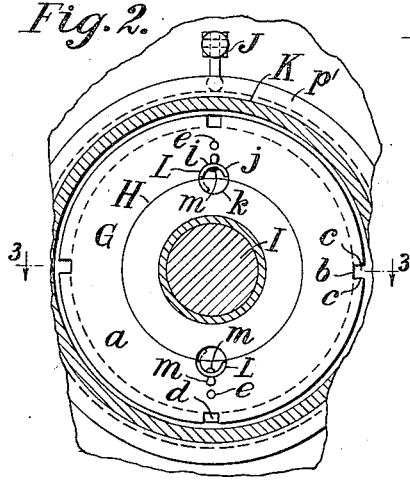
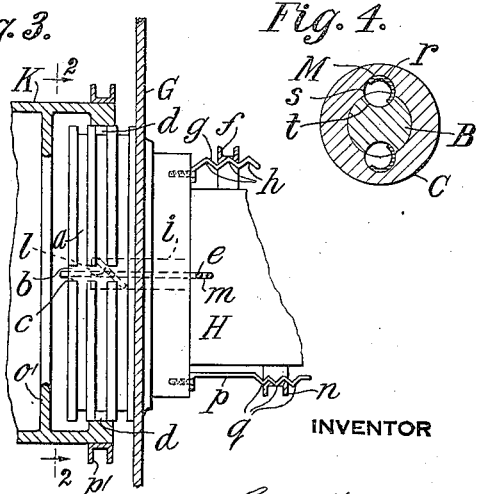
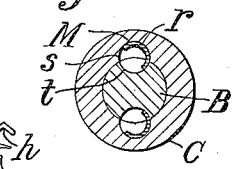
INVENTOR
George Holt Fraser Patented Dec. 14, 1937

2,102,314

UNITED STATES PATENT OFFICE 2,102,314

DRIVE AND DIFFERENTIAL

George Holt Fraser, Brooklyn, N. Y.

Continuation of application Serial No. 643,664, November 21, 1932. This application November 20, 1935, Serial No. 50,674

32 Claims. (Cl. 74—316)

This is a continuation of my original application Serial No. 643,664, filed November 21, 1932.

This invention relates to driving mechanism and to differential transmission, and aims to provide certain improvements therein.

It especially relates to drives for vehicles and to differential motion devices therefor, and aims to provide improvements facilitating control of drive and of differentiation, and facilitating manual and automatic control of these, and to provide improvements especially applicable to four wheel drive and to tractor drive, and to provide improved manually and automatically operable clutches and differentials, for controlling revolution and differentiation, and improvements in the construction, arrangement, and revolution of such parts.

To this end in carrying out the preferred adaptation of my present improvements as applied to a four wheel drive, free wheeling, tractor propulsion, I preferably provide an improved reversely drivingly operable and preferably circumferentially yieldable, manually operated drive clutch between the drive shaft and the beveled drive pinion which meshes with the bevel drive gear of the master gear, for permitting drive connection and disconnection of such pinion against torque in one or both directions, which clutch is preferably circumferentially yieldable for absorbing vibration, and preferably comprises a circumferential lost motion or clearance provision for facilitating its complete engagement without the grind or bite of a jaw clutch, or the slip of a friction clutch, and is preferably semi-cylindrical and oscillatory in co-operative semi-cylindrical key seats carried by the drive shaft and pinion, for engagement or disengagement of one or the other, by which arrangement the entire differential mechanism can be drivingly disconnected from or connected to the drive shaft, for permitting complete free wheeling of the differential relatively to the drive shaft, or for positively driving the differential in either direction from the drive shaft;

And I preferably provide an axially movable clutch for drivingly locking or unlocking the reciprocal bevel gears of the differential, or their respective shafts, for restraining or permitting their differentiation, which preferably is intermediate of and movable axially of these gears and shafts, and movable into and out of active relation thereto, for permitting or resisting their differentiation, and is preferably manually operable from without them for manually controlling such differentiation, and I preferably provide automatically operable differentiation control means revoluble with the differential bevel gears or their shafts, for automatically permitting or restraining their differentiation, which means are preferably centrifugally actuated and counter-balancingly poised and arranged to centrifugally poise such intermediate clutch out of its differentiation restraint position when such gears revolve together, and are centrifugally unbalanced and centrifugally actuated to restrainingly actuate said clutch when said gears differentiate sufficiently to so centrifugally actuate such automatic control, for automatically restraining undue differentiation incident to spinning of one gear or shaft relatively to the other, and in such case to automatically drivingly engage these shafts until the resultant termination of such differentiation permits the centrifugal restrainer to restore the clutch to its non-restraint position;

And I preferably provide an additional or supplemental master member on each bevel gear of the main differential, and provide planetary bevel gear pinions on each additional master gear, and differential bevel gears at each side of such pinions, providing each of the latter bevel gears with concentric shafts projected from the main bevel gear and respectively equipped with drive provisions for sprocket and chain or other drive from one to a forward wheel and from the other to a rear wheel at one side of a four wheel drive vehicle, so that each side of such a vehicle may have a differential for permitting differentiation of its front and rear wheels relatively to the other side and to the main differential, while all will be driven by the main differential;

And I preferably provide such an intermediate clutch and such manual and automatic control for it and for each additional differential, so that each may be manually or automatically restrained from differentiation;

And I preferably provide my first mentioned clutch for each of the bevel gears of each differential, so that any of these may be circumferentially revolubly restrained or released relatively to the part on which it is revoluby mounted, for permitting manual clutching or unclutching of any part while positively driving another, as for facilitating turning a tractor on one wheel, or for drivingly connecting of parts positively with the main master, as for complete positive uniform drive for all wheels.

And I preferably provide various other features of improvement in construction, arrangement and operation, of the parts, all of which will be more fully set forth with reference to the accompanying drawing, in which Fig. 1 is a fragmentary horizontal axial section of a triple differential assembly embodying the preferred form and arrangemnt of my improvements, showing the clutches disengaged;

Fig. 2 is an enlarged fragmentary vertical transverse section of the clutch for the main differential gears, cut approximately on the plane of the lines 2—2 in Fig. 1 and looking in the direction of the arrow;

Fig. 3 is an enlarged fragmentary horizontal section thereof, cut approximately on the plane of the lines 3—3 in Fig. 2, and showing the hub of one of the main differential gears in plan;

Fig. 4 is an enlarged fragmentary cross-section of the main drive pinion, showing its clutches drivingly engaged and cut approximately on the plane of the lines 4—4 in Fig. 1 and looking in the direction of the arrow;

Fig. 5 is an enlarged fragmentary horizontal axial section thereof showing the main drive shaft and its clutch in plan and in its unclutched position;

Fig. 6 is an enlarged fragmentary vertical transverse section of one of the auxiliary differential clutches, showing its clutch engaged, and Fig. 7 is a fragmentary vertical axial section of the axles and differential beveled gears keyed thereto respectively of a single differential drive, showing the preferred application of my invention for such a simple differential drive, for either manual or automatic control of differentiation.

Referring to the drawing A is a main housing for encasing a differential drive mechanism, B is a main shaft for revolving such mechanism, C is a main bevel pinion on such shaft, D is a main bevel gear meshing with and revolved by such pinion, E is a master member carrying such gear and revolved therewith, F are planetary bevel pinions carried by and revolved with and rotatable relatively to the master member E, G are opposed bevel gears in mesh with and revolved by and revoluble relatively to the pinions F, for revolution with and differential revolution relatively to the master member E, and H are separate shafts for the gears G respectively, for propulsively transmitting revolution of the master member to the opposite drive wheels of a vehicle, and for permitting differentiation in the revolution of the shafts, according to any well known principle of differential drive.

These parts may be of any usual or suitable construction and principle of operation, and may be connected and anti-frictionally revolubly mounted in any suitable way.

For a single drive vehicle using a single differential each separate shaft H is usually connected directly to its propulsion wheels, but for a four wheel drive vehicle using additional differentials each shaft H is usually connected to the master member of an additional differential for affording differentiation for its front and rear propulsion wheels in addition to the differentiation afforded by the main differential, and in such case the shafts H are usually tubular and both mounted revolubly on a through shaft I, which is usually a non-rotary carrier shaft or jack-shaft for sustaining the differential assembly in juxtaposition to the several drive connections between it and the propulsion wheels.

Such a single differential construction is shown in my Patent No. 1,838,380 dated Dec. 29, 1931, in which I have shown and claimed an automatically centrifugally actuated and controlled differentiation controller and restrainer revolved with and rotatable relatively to the master member, by being connected with a planetary pinion, so that it is centrifugally actuated by such revolution to permit differentiation during normal revolution, and is centrifugally actuated by rotation of the planetary pinion to restrain differentiation during such rotation.

One feature of my present invention aims to provide improved control and restraint of differentiation by utilization of the revolution of the differential gears for permitting differentiation during normal revolution of such gears and for resisting differentiation during differential revolution of such gears, as distinguished from my said utilization of the rotation of a planetary pinion for such purpose, and according to this feature of my present improvements I preferably provide centrifugally actuated and restrained controllers J on the opposed gears of the differential, and a centrifugally actuated and restrained clutch K in operative relation to and counted-balancingly poised between such controllers, and movable into and out of clutch engagement with said gears or their respective shafts for non-rotatively locking the gears rotatively together to resist differentiation, and for rotatively freeing such parts to permit differentiation.

This may be accomplished by any suitable construction, but preferably I form the controllers J as weighted reversely arranged bell cranks each swingingly hinged to its gear G, with their weighted ends adjacent and their lateral ends opposed, and the clutch K as an axially slidable cylinder or sleeve having grooves $p'$ engaged by the lateral ends of the bell cranks for coupling these so that the stress of each will be transmitted to the other, to counter-balance and neutralize their stresses during normal revolution, and to resist their deflection by gravity and to poise the lock K passively between them until they are unbalanced by differentiation of the gears, whereupon when the centrifugal effect on one bell crank over-balances that of the other sufficiently to shift the lock, the latter may be slid axially from its normal non-restraint position to a restraint position for arresting such differentiation and then forcing revolution of both gears, whereupon equalization of the centrifugal action on the bell cranks will restore the lock to its non-restraint position.

To provide for locking in either direction the neutral position of the lock corresponds with the balanced position of the bell cranks, and locking provisions are provided at each side of its neutral position so that one of these can be engaged when the lock is shifted by excessive revolution of one bell crank and the other may be engaged when it is shifted by excessive revolution of the other bell crank.

Each bell crank is preferably pivoted on an axis extended transversely of the axis of its gear, and tangentially of the latter, so that its weighted end swings radially of its gear and its lateral end swings axially of the gear, and the lock is preferably axially slidable longitudinally of the axis of the gears, and preferably the hub of each gear or its shaft is provided with a plurality of circumferential grooves $a$ affording clear ways around it, which grooves are intersected by one or more axial keyways $b$ affording axial slideways between the grooves, and affording slideways axially of the grooves and affording locking faces $c$ between the grooves, and the clutch K is preferably formed of a cylindrical tube fitting slidingly over these grooves and having an internal projection or key *d* entering and revolubly fitting a groove when the key is in a plane of such groove, and entering the slideway *b* and engaging its locking face *c* when the key is shifted from the plane of the groove, to then non-rotatively connect the key and its gear, and this key and these grooves and slideways are duplicated on the hub of the other gear or its shaft, and so rotatively disposed that both keys and their grooves will rotatively coincide when the lock is in the neutral position, and will lockingly engage with their faces *c* when the lock is in the locked position, to normally permit free revolution of the gears, or to non-rotatively lock them together. The inner hub of each gear G is shown as a male member in the periphery of which the grooves and slideway are formed, and the lock is shown as a cylindrical female member through the periphery of which the key *d* is inwardly projected, but it is immaterial which is the male member and which is the female member, or on which the groove faces and keyways are formed, so long as they can be slid axially into and out of locking engagement, for restraining or permitting differentiation of the gears or their shafts, as any axially slidable clutch intermediate the bevel gears or their shafts for restraining or terminating differentiation or permitting differentiation, comes within the scope of my invention, when the clutch is a pin slidable in a bore in the ends of the shafts or in the adjacent hubs of the gears, or a jaw clutch between them, and whether the grooves are internal or external, and whether the keys are internal or external.

By this feature of improvement spinning or skidding of either wheel will be automatically checked and normal revolution will be restored without additional or manual action on the part of the operator, but according to another feature my invention preferably provides for manual control of such differentiation, which may be accomplished in any desired or suitable manner, but for which I preferably provide axially movable manual operators *e* extended axially from without to within its differential gear and in operative relation to the lock K for manually shifting, restoring, operating or controlling it, and in operative relation to a manual shifter *f* externally of the master member and operable by the operator of the vehicle. Each operator *e* preferably consists of a pin slidable axially of and revoluble with its gear having an inner end adjacent and as to which the lock K is revoluble for engagement with the end of the lock to push the lock from its neutral to its locked position for locking the two gears together, the other operator *e* being used for pushing the lock in the reverse direction from its locked to its neutral position or from its neutral position to its locked position, so that the lock can be shifted and unshifted by first using one operator and then the other. Each operator is preferably retained in position with sufficient resistance by a spring *g* having projections *h* corresponding to the positions in which it is desired to hold a lock until it is shifted. During differentiation the lock K may rotate relative to either pin *e*, as it is rotatively poised between the ends of these pins, and the shifters *f* are preferably connected to mutually move the pins *e* in unison so that each operator will move axially with axial movement of the other to reciprocally confine the lock between their pins.

Thus differentiation may be manually controlled as well as automatically controlled, which suffices for ordinary single drive vehicles, but according to another feature of my invention I preferably provide for free wheeling of the propulsion shafts relatively to the differential, and I preferably accomplish this by providing for manually operated drive disengagement between each differential gear and its shaft. This may be accomplished in any suitable manner, but I prefer to provide a separable clutch L between each differential gear and its shaft H, for drivingly engaging or disengaging these parts, so that normally they must rotate together but when drivingly disengaged the differential gears may revolve freely as to their shafts and their shafts may revolve freely as to their gears and as to each other. Any suitable clutch L may be used but my invention preferably constructs the clutch L of a semi-cylindrical, yieldable, oscillatory and reversible hollow tubular key *i*, oscillatorily mounted in a semi-cylindrical keyway *j* in the hub of the gear G and oscillatory into a semi-cylindrical keyway *k* in its shaft H, for locking the gear and shaft together to transmit torque in one direction or the other according to which way the key is oscillated, or to drivingly disconnect the gear from the shaft when the key is in its neutral position in which both its edges clear the periphery of the shaft. The keyway *k* affords a lost motion gap as it approaches the keyway *j*, into which gap the edge of the key *i* may advance before the keyways come into coincidence, thus permitting easy and full engagement, and the hollow spring wall of the key *i* affords a slight cushion for the torsional shock of such engagement.

The clutch L may be manually operated in any suitable way, but according to the preferred form of my invention it is preferably operated by extending its inner end beyond the hub of its gear G and providing this end with cam faces or slots *l* engaged by a pin or projection *m* carried by a grooved ring *n* operated by a shifter *o* under control of the operator of the vehicle, which pin, when moved axially in the slot causes the key to oscillate from a mid-position in which the key is unlocked to a forward drive position for transmitting torque for forward drive, and to rearward drive position for transmitting torque for rearward drive, the ring being held axially by a spring *p* having projections *q* to retain it in its several positions.

Thus the driver may manually disconnect either or both shafts H from the differential, for permitting free wheeling on either or both of these shafts, but may manually connect either or both for forward or rearward drive, and in case of any such free wheeling differentiation of the gears will be automatically restrained by their centrifugal governors, or manually restrained by manually shifting the clutch K.

In addition to free wheeling of either shaft H my invention preferably provides for positive drive of either shaft and free wheeling of the other shaft for facilitating turning on one wheel by driving the other wheel, which is often desirable in tractors, and this I preferably accomplish by separably drivingly connecting each differential gear with its shaft H, so that either may be drivingly disconnected from the differential while the other shaft is drivingly connected to it, and by non-rotatively clutching the two differential gears together so that they cannot differentiate and must revolve with their master member, so that its revolution will be drivingly transmitted to the driving shaft H, of the differential gear, which is coupled to its shaft and the other shaft H will be free, so that it need not rotate while the coupled shaft is driving the vehicle around the wheel of the uncoupled shaft. For this purpose I preferably duplicate the clutches L and their manual operators n, which in such case are not connected with each other and are independently manually operable, so that the operator of the vehicle can operate one side or the other according to which it is desired to turn on.

In the construction shown the manual disconnection of either shaft H from its gear G will permit the latter to spin relatively to the other gear G, and this differentiation will centrifugally actuate the automatic bell cranks and cause them to automatically lock these gears so that both must revolve with their master member and transmit its revolution to the shaft H of the gear which has not been unclutched, thus automatically eliminating differentiation of the differential gears as soon as either is manually uncoupled from its shaft, so that it will not be necessary for the operator to do more than manually uncouple one shaft in order to drive only the other shaft for making a turn on the wheel of the uncoupled shaft, and then to manually recouple the latter for resuming normal drive, whereupon the centrifugal restrainers will again become centrifugally balanced and automatically unlock the differential gears for again permitting their differentiation.

For free wheeling of both axles H relative to the differential for driving them, it will be necessary in this construction for the operator to manually uncouple each shaft from its differential gear, whereupon each shaft may free wheel idly in the differential until both are again manually coupled to it.

Where my oscillatory clutch is not required or where space precludes using it, jaw clutches between the hubs of the gears G and the ends of the shafts H may be substituted by providing these parts with radial notches engaged by teeth on the clutches and sliding the latter axially into and out of engagement, for drivingly connecting or disconnecting a shaft with its gear, in which case the shaft will be centrally bored for receiving a pin carried by the clutch, which pin will be revolubly connected to the shifter ring for axially shifting the clutch from the ring instead of for circumferentially oscillating it, these clutches being sufficiently spaced axially to permit disengagement of either for turning on its wheel or both of them for free wheeling, but I prefer the oscillatory clutch because of its easy operation and the clearance for its engagement afforded by its keyseats as they approach coincidence.

As thus far described free wheeling is permissible while the differential is revolving around the shafts H, but according to one feature of my invention I prefer to permit elimination of drive of the differential during free wheeling, so that it may idly revolve with the shafts when they are not coupled to it, but may be passive when they are coupled to it, and so that the main drive may be drivingly disconnected from the differential for free wheeling, and this I preferably accomplish by providing an oscillatorily reversible circumferentially yieldable, freely engageable clutch M between the master pinion and its drive shaft, disengageable to drivingly disconnect these parts and reversely engageable for drivingly engaging them to transmit torque in one direction or in the other direction, when it is desired to use a reversible drive shaft. This clutch is preferably identical in construction and operation with the clutch L, and is preferably duplicated at diametrically opposite points and as shown preferably consists of a semi-cylindrical hollow key r mounted in a semi-cylindrical keyway s in the pinion C and oscillatory into a reciprocal semi-cylindrical keyway t in the shaft B, and having a peripheral cam slot u engaged by a pin v in a grooved ring w which is moved axially of the shaft B for oscillating the key from its intermediate neutral or unlocked position to a forward locking position for transmitting torque or forward drive and to a reverse locking position for transmitting torque for rearward drive on the principle before described. The ring w is manually operated by a shifter x and held in either position by a spring or catch y having projections z yieldingly engaging a notch in the ring w to resist its accidental shifting from any position to which it is manually thrown.

In this manner the master pinion can be drivingly disconnected from the drive shaft or drivingly connected to it to transmit revolution in either direction, and when disconnected this pinion and the differential will be passive relative to the drive shaft, and need not participate in its revolution, but may participate with either or both of the shafts H when the latter are drivingly connected to the differential. This, together with uncoupling shafts H avoids unnecessary revolution of the differential, and permits independent revolution of the drive shaft.

When the clutch engageable clearance afforded by the mutually approachable keyways facilitates complete driving engagement of the key as the keyways approach coincidence it also affords a space at the concave side of the key, the existence of which might permit chattering between a driving and a driven part, and my invention preferably provides for preventing such chattering, which I preferably accomplish by reversely oscillating the diametrically opposite keys of each of the oscillating couplings desired, so that one key will transmit torque in the driving direction, and the other key will resist torque in that direction so that the two keys reciprocally afford a dead lock coupling for resisting chattering or lost motion between the coupled parts, and this I preferably accomplish by providing a reversely operable oscillatory connection between the two keys of a coupling, so that they will oscillate oppositely, which may be interengaging racks or projections extended inwardly from the concave sides of the keys, and across the end of the shaft and intermeshing coincident with its axis where clearance permits this, as in the case of the main drive pinion C, but is preferably accomplished by making the cam grooves in the keys r so inclined that the keys will be reversely oscillated by the pins of the shifter when the latter is moved axially of the keys.

While the propulsion shafts H are connected directly to the drive wheels of a single drive vehicle, for a four wheel drive vehicle I prefer to provide on each shaft H an auxiliary or additional differential N, which preferably comprises a cup shaped master member O carried on or formed with its shaft H and carrying planetary bevel pinions P between and meshing with an inner differential bevel gear Q and an outer differential gear R, for driving these and permitting their differentiation; and I preferably provide the gear Q with a tubular shaft S extended revolubly through a tubular shaft T provided for the gear R, and provide chain sprockets or other drive gear provisions U on the ends of these shafts for drivingly connecting them respectively with the front and rear wheels of the vehicle, which additional differentials are each preferably according to one feature of my invention provided with centrifugally actuated and restrained automatic differentiation control means V for automatically restraining or permitting their differentiation, and with manually operable coupling means W for manually controlling or restraining their differentiation, and with manually operable clutch means X for drivingly clutching or unclutching each of these differential gears with its shaft, so that either of the shafts S and T may be drivingly connected or disconnected with the differential and the other used for non-differentiation drive, for positively driving one wheel and not driving the other, or both these shafts can be drivingly disconnected from their differential gears, for free wheeling both of them relative to their differential. Preferably I provide a manually operable shifter Y for manually operating the coupling W, and a manually operable shifter Z for manually operating the clutch X, so that either of these may be operated by the operator.

Any suitable construction may be used for the parts V, W, X, Y and Z, but I prefer the constructions shown, which are identical with those described for the main differential, and I prefer to provide the coupling W with an internal clearance groove $a'$ affording a lost motion revoluble connection between it and the pin $b'$ carried by the grooved ring $c'$ of its shifter, so that the coupling may be moved by the shifter in either direction, which is constructed like the ring $f$ and held in its several positions by a leaf spring $d'$ having projections $e'$ engaging the ring, and to construct the clutches X with the key $f'$ having cam slots $g'$ engaged by pins $h'$ carried by rings $i'$ mounted on and axially slidable of these keys, and one of which rings is directly engaged by its shifter Z, and the other of which rings is revolubly connected by a hook rod $j'$ with a ring $k'$ revolubly connected to its shifter $l'$, one ring $i'$ being positioned by a spring $m'$ mounted on the gear R, and the other ring $k'$, being positioned by a spring $n'$ mounted on the gear Q.

In operation the main pinion C will be clutched to the drive shaft B for driving in either direction, and will be drivingly disconnected with this shaft for drivingly disconnecting the differential and the propulsion shafts from the main drive. When the pinion C is drivingly connected the main differential may permit differentiation between the auxiliary differentials, and each of these may permit differentiation between its front and rear driving wheels, and any excessive differentiation will be automatically restrained in either differential and will be automatically restrained by its centrifugal controller.

The main differential will be manually locked by its coupling K for positively driving the auxiliary differentials from it, or will be manually uncoupled from the auxiliary differentials for free wheeling of these relatively to it, or will be manually unclutched from either of the shafts H for positively driving the other for turning on the wheel of the uncoupled shaft.

The auxiliary differentials will be automatically or manually controlled, coupled and clutched according to the same principle, for permitting or resisting differentiation, affording free wheeling, or affording positive drive of either wheel while permitting free wheeling of the other wheel of one side of a vehicle.

It will be seen that my invention provides improvements which can be readily and advantageously availed of in whole or in part, and it will be understood that the invention is not limited to the particular details of construction, combination, arrangement, or use, set forth and shown as constituting the preferred form of my improvements, since these can be used in whole or in part according to such modifications as circumstances, or the judgment of those skilled in the art, may dictate, without departing from the spirit of my invention.

One such modification is shown in Fig. 7, which shows the preferred application of my invention preferably for both automatically and manually controlling differentiation of the differential gears and the ends of the axles on which they are fixed for a simple differential such as that in which the axles are directly connected to the propulsion wheels of a vehicle, in which construction the lock is preferably a male member and axially slidable in female sockets in the inner periphery of which the grooves and locking faces are formed for co-operating with the locking projections on the periphery of the lock. Preferably as shown in this figure the differential beveled gears G' are spaced and respectively fixed on the spaced ends of differential axles H', which are preferably formed with axial sockets I' having internal grooves $a7$ connected by keyways $b7$ and locking faces $c7$ between the grooves, and the lock K' consists of a cylinder axially slidably mounted in the sockets I' and having square peripheral projections $d7$ revolubly fitting in the grooves $a7$ when the key K' is in neutral position, and axially slidable in the keyways $b7$ into non-rotative engagement with the locking faces $c7$ when the key K' is axially shifted, for then non-rotatively locking both shafts H' and both gears G' together to prevent differentiation.

The key K' may be axially moved automatically, in any desired manner, into and out of its neutral and locking position, but I prefer to both automatically and manually operate it, preferably automatically by centrifugal levers J' similar to those before described, which are oppositely mounted on the beveled gears respectively and reactingly, co-actingly and counterbalancingly, revolubly connected preferably by a tubular sliding sleeve L' axially slidable of and revolubly mounted on the hubs of both gears, and revolubly connected to the key K', preferably by a pin $o7$ revolubly engaging a groove $p7$ around the key K', when the sleeve is axially shifted by differential centrifugal action of the levers J', and to manually shift the key by manually operable grooved rings $f7$ around and slidably axially of the shaft and carrying pins $g7$ slidably extended through slots $h7$ and spaced adjacent the outer ends of the key K' for permitting its automatic movement, and movable against it for axially moving it manually for resisting its automatic movement or for manually locking or unlocking the parts.

In this construction the lock is a cylindrical bolt having a peripheral locking projection and fitting a cylindrical bore extended axially concentric of the end of the shaft and the grooves and locking faces are formed in the inner periphery of this bore, but it is immaterial which of these parts is provided with the projection, and which is provided with the grooves and locking faces so long as they are disposed to permit axial movement of the one relatively to the other and to afford a rotative connection when the parts are in one relative axial position and to resist their relative rotation when the parts are in another axial relation, and in this construction there is preferably an axial lost motion connection between the lock and the sleeve L'.

Preferably in the construction shown in Fig. 1 axial lost motion clearance is provided between the lock X and its manual shifters, as by spacing the ends of the pins e axially from the flange o', and for the lock W by spacing the sides of the groove a' axially from the shifter pin b', so that automatic movement of these locks may occur without effecting the manual operator therefor, and the manual operators will not become effected until moved axially sufficiently to exceed such clearance.

It will be noted that my invention affords a revolution connection between each centrifugal controller and its lock, and between each lock and its automatic and its manual operators, and between each lock and the relatively rotatable parts with which it co-operates, so that the lock may when passive and in its neutral position permit normal functioning of the elements with which it is used, while it may be axially displaced axially of them for temporarily or permanently resisting differentiation thereof, and that it may be used in simple form for an ordinary differential drive, and in multiple or complementary forms for meeting the various requirements of tractor drive or four wheel drive.

Preferably the shafts H are axially spaced by anti-frictional bearings q', and the keys i are axially spaced by rings r'.

Although for the purpose of more fully illustrating the applicability of my present improvements I have shown them as availed of in conjunction with a circumferentially oscillatory semi-cylindrical radially yieldable clutch r or X, having a circumferential oscillation provision u, and oscillated by an oscillator v, this clutch is not claimed as a clutch herein, being generically claimed as a clutch for any purpose in my companion application Serial No. 610,807, filed May 12, 1932.

Although for the purpose of more fully illustrating the preferred utilization of my present improvements in clutch controlled orbital differential drives, I have shown them as used in conjunction with clutches K, W and K', having a pair of axially spaced clutch provisions axially movable in the same direction at the same time, and simultaneously engageable and disengageable with reciprocal provisions on the differential gears of an orbital differential, and automatically operated by differentiation of said gears, and this clutch is claimed herein as a part of a differential gearing, being generically and specifically claimed as a clutch for any purpose in my companion application Serial No. 50,223, filed Nov. 16, 1935, as a division of my said original application.

What I claim is:

1. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is rotatably mounted, for driving said master pinion, and a drive discontinuance drive connection between said master pinion and said drive shaft comprising reciprocal keyways in the adjacent peripheries of said master pinion and said shaft, and a radially yieldable movable key movable into and out of driving engagement with said keyways for drive connection and drive disconnection of said master pinion and said drive shaft, and yieldable circumferentially of said peripheries, for yieldably resisting drive torque, for yieldable drive connection and disconnection of said master pinion and said drive shaft, for yieldably controlling drive of said master gear.

2. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is rotatably mounted, for driving said master pinion, and a drive discontinuance drive connection between said master pinion and said drive shaft comprising spaced circumferentially approachable female keyways in the adjacent peripheries of said master pinion and said drive shaft, and reversely operable keys reversely movably mounted in said keyways and reversely movable into and out of drive engagement with said keyways respectively, for drive engagement and disengagement of said master pinion and said drive shaft, and for opposite resistance of torque in either direction.

3. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is rotatably mounted, for driving said master pinion, and a drive discontinuance drive connection between said master pinion and said drive shaft comprising semi-circular reciprocal keyways in the adjacent peripheries of said master pinion and said drive shaft, and a semi-circular oscillatory key oscillatorily mounted in one of said keyways and having opposite key faces coincident with said peripheries for drive disengagement of said master pinion and said drive shaft and alternately oscillatory into engagement with the other keyway, for alternately resisting torque in one or the other direction of drive, for drive disconnection of said master pinion and said drive shaft, and for drive connection of said master pinion and said drive shaft in either direction of rotation, for controlling drive of said master gear in either direction.

4. In a differential drive comprising a master gear, an orbital pinion revolved by said gear and rotatable on an axis radially of said gear, differential gears revolved by and revoluble with said orbital pinion, and driven axles driven by said differential gears respectively, a rotatable master pinion in mesh with said master gear, for revolving the latter, a rotatable drive shaft on which said master pinion is mounted, for driving said master pinion, drive disconnection means between one of said differential gears and its said axle, for free wheeling such axle relatively to said gears, and differentiation resistance means between and in operative relation to said differential gears, for resisting differentiation of the latter from between them when one of said gears is drivingly disconnected from its axle.

5. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, drive discontinuance means between said differential gears and said axles respectively for free wheeling said axles relatively to said differential gears, and differentiation resistance means between and in operative relation to said differential gears for resisting differentiation from between them of both of said differential gears during such free wheeling.

6. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, and an auxiliary differential comprising an auxiliary master member carried by and revolved with one of said axles, an orbital pinion revolved by and rotatable as to said auxiliary master member, auxiliary differential gears revolved by and revoluble as to said auxiliary orbital pinion, auxiliary axles for said auxiliary differential gears respectively, propulsion drive connections from said auxiliary axles respectively, and oscillatory drive discontinuance connections between said auxiliary differential gears and said auxiliary axles respectively, for controlling drive of said propulsion connections respectively.

7. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, an auxiliary differential comprising an auxiliary master member carried by and revolved with one of said axles, an orbital pinion revolved by and rotatable as to said auxiliary master member, auxiliary differential gears revolved by and revoluble as to said auxiliary orbital pinion, auxiliary axles for said auxiliary differential gears respectively, propulsion drive connections from said auxiliary axles respectively, and differentiation resistance means between and in operative relation to said auxiliary differential gears and inwardly of said auxiliary orbital pinion, for resisting from inwardly of said auxiliary orbital pinion and from between said auxiliary differential gears differentiation of the latter, for resisting differentiation of said propulsion means.

8. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, an auxiliary differential comprising an auxiliary master member carried by and revolved with one of said axles, an orbital pinion revolved by and rotatable as to said auxiliary master member, auxiliary differential gears revolved by and revoluble as to said auxiliary orbital pinion, auxiliary axles for said auxiliary differential gears respectively, propulsion drive connections from said auxiliary axles respectively, drive discontinuance means between one of said auxiliary axles, and its auxiliary differential gear, for free wheeling such auxiliary differential gear relative to its said axle, and differentiation resistance means between said auxiliary differential gears, for resisting differentiation of said differential auxiliary gears when one of the latter is drivingly disconnected from its axle.

9. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, an auxiliary differential comprising an auxiliary master member carried by and revolved with one of said axles, an orbital pinion revolved by and rotatable as to said auxiliary master member, auxiliary differential gears revolved by and revoluble as to said auxiliary orbital pinion, auxiliary axles for said auxiliary differential gears respectively, propulsion drive connections from said auxiliary axles respectively, drive disconnection means between said auxiliary differential gears and their said axles respectively, for free wheeling said axles relatively to said auxiliary differential gears, and differentiation resistance means between and in operative relation to said auxiliary differential gears, for preventing their differentiation during such free wheeling.

10. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, an auxiliary differential comprising an auxiliary master member carried by and revolved with one of said axles, an orbital pinion revolved by and rotatable as to said auxiliary master member, auxiliary differential gears revolved by and revoluble as to said auxiliary orbital pinion, auxiliary axles for said auxiliary differential gears respectively, propulsion drive connections from said auxiliary axles respectively, separate drive discontinuance connections between said first differential and said auxiliary differentials respectively for drivingly disconnecting either of the latter, and differentiation resistance means in operative relation to said first differential, for preventing differentiation of its differential gears upon drive discontinuance of one of said auxiliary gears.

11. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and centrifugally operated differentiation resistance means carried by and revoluble with said differential gears respectively, and in operative relation to said differential gears, for resisting their differentiation, and centrifugally actuated by normal revolution of said differential gears and adapted to permit such differentiation during normal revolution of such differential gears, and differentially centrifugally actuated by differential revolution of said differential gears, for then restraining such differentiation.

12. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, centrifugally operated differentiation resistance means carried by and revoluble with said differential gears respectively, and in operative relation to said differential gears, for resisting their differentiation, and centrifugally actuated by normal revolution for permitting such differentiation, during normal revolution of such differential gears, and counter-actuated centrifugal differentiation control means carried by and revolved with said differential gears respectively, and centrifugally actuated by such revolution, and in operative relation to said differential gears, for permitting and resisting their differentiation, and counter-actingly connected for counter-actingly permitting such differentiation during normal revolution of said differential gears, and for counter-actingly resisting such differentiation during differential revolution of said differential gears, for automatically centrifugally counter-actingly controlling such differentiation.

13. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, and a drive discontinuance drive connection between said master member and said driven shafts comprising a centrifugally actuated operator carried by and revoluble with one of said differential gears, and centrifugally actuated by such revolution of such gear, and differentiation resistance clutch means in operative relation to said differential gears for resisting such differentiation, and in operative relation to and controlled by said centrifugal means, for permitting such differentiation during normal revolution of said differential gears, and for resisting such differentiation during differential revolution of said differential gears.

14. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for driving said master pinion, and a drive discontinuance drive connection between said master member and said driven axles comprising differentiation resistance means inwardly of said orbital pinion and intermediate of and carried by said differential gears and movable into and out of differentiation resistance position relatively thereto, for controlling from inwardly of said orbital pinion and intermediate said differential gears such differentiation.

15. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and axially movable differentiation resistance means intermediate of said differential gears and movable between and axially of the latter into and out of differentiation resistance engagement relatively thereto, for controlling from between said differential gears such differentiation.

16. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and cylindrical axially slidable differentiation resistance means intermediate of and concentric of and slidable axially of said differential gears, and slidable into and out of differentiation resistance engagement relatively thereto, for controlling from intermediate of and concentric of said differential gears such differentiation.

17. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and differentiation resistance means around and movable axially of and as to said differential gears, in operative relation thereto and movable into and out of differentiation resistance engagement therewith, for controlling such differentiation.

18. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and differentiation resistance means, for resisting such differentiation, comprising a cylindrical part revoluble with said differential gears and having axially spaced circumferential grooves and an axially extended peripheral keyway between and in communication between said grooves, and an axially movable clutch slidably engaged with said part, and having key provisions axially movable into the plane of said grooves, for permitting such differentiation, and axially movable in said keyway and out of said plane, for resisting such differentiation, for controlling such differentiation.

19. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and differentiation resistance means for resisting differentiation of said differential gears comprising inwardly extended portions carried by and projected between said differential gears, and having reciprocal clutch provisions, and an axially movable clutch member axially slidably mounted between said differential gears and having clutch provisions reciprocal to said clutch provisions and slidable into and out of engagement with the latter, for permitting and resisting such differentiation, for controlling such differentiation.

20. In a differential drive comprising a master gear, an orbital pinion revolved by said gear and rotatable on an axis radially of said gear, differential gears revolved by and revoluble as to said orbital pinion, and driven axles driven by said differential gears respectively, a rotatable master pinion in mesh with said master gear, for revolving the latter, a rotatable drive shaft on which said master pinion is mounted, for rotating said master pinion, and differentiation resistance means comprising an axially slidable clutch member connected to said differential gears and slidable relatively thereto into and out of clutch engagement therewith, for permitting and resisting such differentiation, and axially movable centrifugally actuated hinged operator means hinged to and revoluble with said differential gears respectively, and having oppositely extended weighted ends centrifugally actuated by such revolution, and having axially movable operator ends in operative engagement with said clutch member, for axially moving the latter, and axially connected thereby, for transmitting the stress of said operators from one to the other, and for resisting operation of said clutch member with variations in such stress, for automatically permitting and resisting such differentiation.

21. In a differential drive comprising, a master member revoluble about an axis, an orbital member revolved by said member and rotatable about another axis, differential members revoluble about an axis common to both of said differential members, revolved by and revoluble as to said orbital member, driven parts revolved by said differential members respectively, bearing provisions on which said revoluble parts are revolubly mounted respectively, for permitting normal and differential revolution of said differential members, and rotation permission and differentiation resistance means revoluble with said differential members respectively, for permitting and resisting differentiation; the combination therewith of connector means common to and in operative relation to said rotation permission and differentiation resistance means, revoluble with both of said differential members during said resistance, and revoluble relatively to each of said differential members during said differentiation, for controlling said revolution.

22. In a differential drive comprising, a master member revoluble about an axis, an orbital member revolved by said member and rotatable about another axis, differential members revoluble about an axis common to both said differential members, revolved by and revoluble as to said orbital member, driven members revolved by said differential members respectively, bearing provisions on which said revoluble parts are revolubly mounted respectively, for permitting normal and differential revolution of said differential members, rotation permission and differentiation resistance means in operative relation to said differential members respectively, revoluble with said differential members for resisting said differentiation and revoluble relatively to said differential members for permitting said differentiation, and connector means common to and in operative relation to and for controlling operation of said rotation permission and differentiation resistance means; the combination therewith of a revoluble connection between said connector means and each of said differential members, constructed and arranged to permit said connector means to revolve with both of said differential members during said resistance, and to revolve relatively to each of said differential members during said differentiation, for controlling said revolution.

23. In a differential drive comprising, a master member revoluble about an axis, an orbital member revolved by said member and rotatable about another axis, differential members revoluble about an axis common to both said differential members, revolved by and revoluble as to said orbital member, driven members revolved by said differential members respectively, bearing means on which said revoluble parts are revolubly mounted, for permitting normal and differential revolution of said differential members, and rotation permission and differentiation resistance provisions in operative relation to said differential members respectively, axially spaced from and respectively disposed at opposite sides of a transverse intersection of said common axis, for permitting and resisting said differentiation; the combination therewith of axially movable connector means common to and in operative relation to and for controlling operation of said rotation permission and differentiation resistance provisions, axially extended across said intersection, movable axially of said common axis, and having rotation permission and prevention provisions axially spaced from each other and from each side of said intersection, respectively reciprocal to and respectively coincidently similarly movable into engagement with said first provisions respectively, for resisting said differentiation, and coincidently similarly respectively movable out of said engagement with said first provisions respectively, for permitting said differentiation, said connector means being revoluble with said differential members during said resistance, and being revoluble relatively to one of said differential members during said permission, for controlling said revolution.

24. In a differential drive comprising a master member, an orbital pinion revolved by said member and rotatable on an axis radially of said member, differential gears revolved by and revoluble as to said orbital pinion, and driven axles driven by said differential gears respectively, bearing provisions in which said differential gears are revolubly mounted respectively, for permitting normal revolution of the latter, auxiliary differential means drivingly connected to said first differential means and comprising auxiliary differential gears and auxiliary differential axles for the latter respectively, for permitting differentiation of said auxiliary axles, and a separable drive discontinuance connection between said differentials, for drivingly connecting and drivingly disconnecting said differentials, for controlling drive of said auxiliary axles.

25. In a differential drive comprising a master member, an orbital pinion revolved by said member and rotatable on an axis radially of said member, differential gears revolved by and revoluble as to said orbital pinion, and driven axles driven by said differential gears respectively, bearing provisions in which said differential gears are revolubly mounted respectively, for permitting normal revolution of the latter, auxiliary differentials driven by said axles respectively and each comprising auxiliary differential gear axles, for permitting differentiation of said auxiliary axles relatively to said first differential, drive discontinuance means between said first differential and said auxiliary differentials respectively, for drivingly connecting or drivingly disconnecting said first differential with said auxiliary differentials respectively, and differentiation resistance means in operative relation to said first differential for resisting differentiation thereof during such drive disconnection, for free wheeling one of said auxiliary differentials and driving the other thereof from said first differential.

26. In a differential drive comprising a master member, an orbital pinion revolved by said member and rotatable on an axis radially of said member, differential gears revolved by and revoluble as to said orbital pinion, and driven axles driven by said differential gears respectively, bearing provisions in which said differential gears are revolubly mounted respectively, for permitting normal revolution of the latter, auxiliary differentials driven by said axles respectively and each comprising auxiliary differential gear axles, for permitting differentiation of said auxiliary axles relatively to said first differential, drive discontinuance means between said first differential and said auxiliary differentials respectively, for drivingly connecting or drivingly disconnecting said first differential with said auxiliary differentials respectively, and differentiation resistance means in operative relation to said auxiliary differentials respectively, for resisting differentiation of their axles, and resistance control means for said auxiliary differentials respectively, for controlling resistance of differentiation therein, for permitting resistance of such differentiation in one of said auxiliary differentials and permitting such differentiation in the other of said auxiliary differentials.

27. In differential gearing, a pair of relatively revolubly connectable and disconnectable revoluble driven members, each having an axially extended cylindrical slideway adjacent the other and a clutch provision adjacent said slideway, and an axially movable clutch intermediate of and slidable axially of said members and having a cylindrical slideway slidably fitted to and axially slidable in said slideways, and having clutch provisions in juxtaposition to said first clutch provisions respectively, and slidable into and out of engagement with both said first clutch provisions, for simultaneously revolubly engaging and disengaging said members, and means for axially sliding said clutch member.

28. In differential gearing, a pair of relatively revolubly connectable and disconnectable revoluble driven members, revoluble about the same axis, and having adjacent cylindrical slideway portions having circumferentially grooved peripheries and each having a clutch provision in communication with its groove, and an axially slidable clutch member between said members and having a cylindrical slide portion slidably fitted to said slideways, and having clutch provisions revolubly entering said grooves respectively and axially movable into and out of drive connection with said clutch provisions respectively, for drivingly connecting and disconnecting said members, and means for axially moving said clutch member.

29. In differential gearing, a pair of relatively revolubly connectable and disconnectable revoluble driven members revoluble about the same axis and each having a clutch provision adjacent the other, and an axially slidable clutch member intermediate of and revolubly connectable and disconnectable with both of said members, mounted around said axis, and slidable axially thereof for clutchingly engaging and disengaging both said members, and having clutch provisions reciprocal to said clutch provision respectively, and simultaneously movable into and out of drive engagement with said clutch provisions respectively, for drivingly connecting and disconnecting said first members, and means for axially moving said clutch member into and out of drive engagement with both of said first members.

30. In differential gearing, a pair of relatively revolubly connectable and disconnectable revoluble driven members revoluble about the same axis and each having clutch provisions, and a tubular axially slidable clutch member intermediate of and axially slidably mounted between said first members, and revolubly connectable and disconnectable with both said first members, and having clutch provisions reciprocal to said clutch provisions respectively, and simultaneously slidable into and out of drive engagement with both said first clutch provisions, for simultaneously drivingly connecting and disconnecting both said first members and said clutch, and means for axially sliding said clutch.

31. In differential gearing, a pair of relatively revolubly connectable and disconnectable revoluble driven members relatively revoluble about the same axis, and each having an axially extended cylindrical slideway opposite and opposed to the other, and each having a peripheral groove circumferentially of said slideway, and each having an axially extended keyway in communication with said groove, and an axially slidable clutch member intermediate of said first members and having a cylindrical slideway slidingly fitted to said slideways and axially slidable thereof, and having key projections coinciding with and revolubly entering said grooves respectively, and slidingly movable from said grooves into said keyways respectively, for revolubly disconnecting and connecting said first members and said clutch member simultaneously, and means for axially moving said clutch member.

32. In differential gearing, a pair of relatively revolubly connectable and disconnectable revoluble driven members, revoluble about the same axis, and each having a cylindrical slideway axially extended toward the other, and an axially slidable tubular clutch member intermediate of and revoluble with and as to said first members and having a cylindrical slideway slidingly and revolubly fitted on said first slideways, said first members each having an external clutch provision and said clutch member having internal clutch provisions reciprocal to said provisions and axially slidable into and out of drive engagement with the latter, for drivingly connecting and disconnecting said first members and said clutch member, and means for axially sliding said clutch member.

GEORGE HOLT FRASER.